US008424495B2

(12) United States Patent
Rivera-Brutto

(10) Patent No.: US 8,424,495 B2
(45) Date of Patent: Apr. 23, 2013

(54) COVER ASSEMBLY FOR PROTECTING A DRESSING ON A DOG'S LEG

(76) Inventor: Evelyn Rivera-Brutto, Naperville, IL (US)

( * ) Notice: Subject to any disclaimer, the term of this patent is extended or adjusted under 35 U.S.C. 154(b) by 98 days.

(21) Appl. No.: 13/065,827

(22) Filed: Mar. 31, 2011

(65) Prior Publication Data

US 2012/0247399 A1 Oct. 4, 2012

(51) Int. Cl.
*A01K 13/00* (2006.01)

(52) U.S. Cl.
USPC .......................................................... 119/850

(58) Field of Classification Search .................. 119/725, 119/726, 728, 850, 856, 863, 865, 712; 602/3, 602/23, 26, 60, 61, 62, 63; 54/79.1, 82
See application file for complete search history.

(56) References Cited

U.S. PATENT DOCUMENTS

| | | | | |
|---|---|---|---|---|
| 2,443,831 | A * | 6/1948 | Miller | 54/79.1 |
| 4,744,333 | A * | 5/1988 | Taylor | 119/850 |
| 6,880,489 | B2 * | 4/2005 | Hartmann et al. | 119/856 |
| 2007/0044735 | A1 * | 3/2007 | Zimmerman | 119/856 |
| 2008/0022945 | A1 * | 1/2008 | Hughes et al. | 119/850 |
| 2008/0177210 | A1 * | 7/2008 | McDevitt Larson | 602/23 |
| 2010/0043724 | A1 * | 2/2010 | Sherer | 119/850 |
| 2011/0017151 | A1 * | 1/2011 | Simoni | 119/850 |

* cited by examiner

*Primary Examiner* — Rob Swiatek
*Assistant Examiner* — Lisa Tsang
(74) *Attorney, Agent, or Firm* — Gregory B. Beggs

(57) ABSTRACT

A cover assembly is disclosed for holding and maintaining a protective sleeve in place on a dog's leg. The assembly includes a harness portion with a dorsal support member, a belly support member, and a chest support member, a sleeve portion with an end having an inner face and a first gripping member mounted on the inner face, and a connecting member engaged on the dorsal, belly and chest support members with a second gripping member arranged to engage the first gripping member and join the sleeve portion to the harness portion.

2 Claims, 5 Drawing Sheets

COVER ASSEMBLY FOR PROTECTING A DRESSING ON A DOG'S LEG

FIELD OF THE INVENTION

This invention relates to protective coverings designed to keep a dog from removing dressings on one or more of its legs. More particularly, it relates to fastening a sleeve surrounding the dog's injured limb to a harness with a member which connects the top of the sleeve to the harness and keeps it high on the dog's limb and close to the dog's body so that the animal cannot dislodge it.

BACKGROUND OF THE INVENTION

A variety of harness systems have been designed for keeping a covering on a dog's legs. One such system is shown in U.S. Pat. No. 4,633,817 (also shown in No. 4,744,333). Buckles are secured to the outside edges of socks on the dog's feet, and a suspender arrangement utilizing elastic ribbons threaded into the buckles is placed over the dog's shoulders and hindquarters. Design patents Nos. Des. 375,586 and Des. 376,448 disclose similar arrangements. In U.S. Pat. No. 5,341,765 a dog is shown wearing leg holsters with their outside edges fastened to an elongated back strap. There is also a chest strap fastened to the back strap which is passed below the animal. Similar sleeves and supporting members are shown in U.S. Pat. Nos. 6,240,882; 5,076,043; and 3,791,383, as well as United States Application No. 2008/0022945.

Paw coverings for a cat are illustrated in U.S. Pat. No. 5,676,095 and United States Application No. 2008/0173258. A body jacket designed to restrict loose animal hair is shown in U.S. Pat. No. 6,481,383 with strategically placed snaps along the outside edges for joining leg coverings to the jacket. United States Application No. 2007/0163520 illustrates a diaper held onto a dog's hindquarters. A horizontal strap passing around the dog's chest is fastened to the diaper with a VELCRO® strip of material.

U.S. Pat. No. 3,791,383 recognizes the tendency of animals whose limbs have been wounded to gnaw, chew or otherwise get at the injury, and the patent emphasizes a need to prevent such animals from reaching the injury. The patents noted above illustrate various ways of holding sleeves on injured animal limbs for therapeutic purposes. And an elbow pad provided with extra padding, or a pocket for holding ice, is shown in U.S. Pat. No. 4,479,457.

Thus, several inventors have sought to solve the problem of preventing a dog (or a cat or other four legged pet) from displacing leg coverings, especially when the coverings are needed for therapeutic purposes.

It is an object of the present invention to provide a leg covering assembly which connects a protective sleeve with a harness on a dog's body at a point high on the dog's body and around the dog's injured limb so that the animal cannot dislodge it.

It is a further object of this invention to connect the top of a protective sleeve member to a harness close to the junction of the dog's limb and trunk, and maintain it there.

It is a further object of this invention to provide a means for connecting and holding a protective sleeve on a dog's leg in place and concomitantly allow the sleeve to be easily placed over the leg and adjusted to a secure and comfortable place on the animal.

It is a further object of this invention to provide a connection member for attaching a protective sleeve over a dog's leg which can be easily moved to a desired position prior to having the sleeve engaged.

These and other objects of the invention will become apparent after reading the description of the invention which follows.

SUMMARY OF THE INVENTION

This invention is a harness system for holding a protective sleeve on an injured leg of a dog in place. The system includes a harness portion, at least one leg sleeve portion and a special connecting member between the harness and the sleeve. Together they comprise a cover assembly for protecting a dressing, or even just a wounded area, on the dog's leg. The connecting member surrounds the base of the injured leg, either a foreleg of a hind leg, and is held in place by adjacent portions of the harness. It is easily moved to a position next to the dog's body where the animal cannot dislodge it or the upper end of the sleeve attached to it

DETAILED DESCRIPTION OF THE PREFERRED EMBODIMENTS

Figure 1:
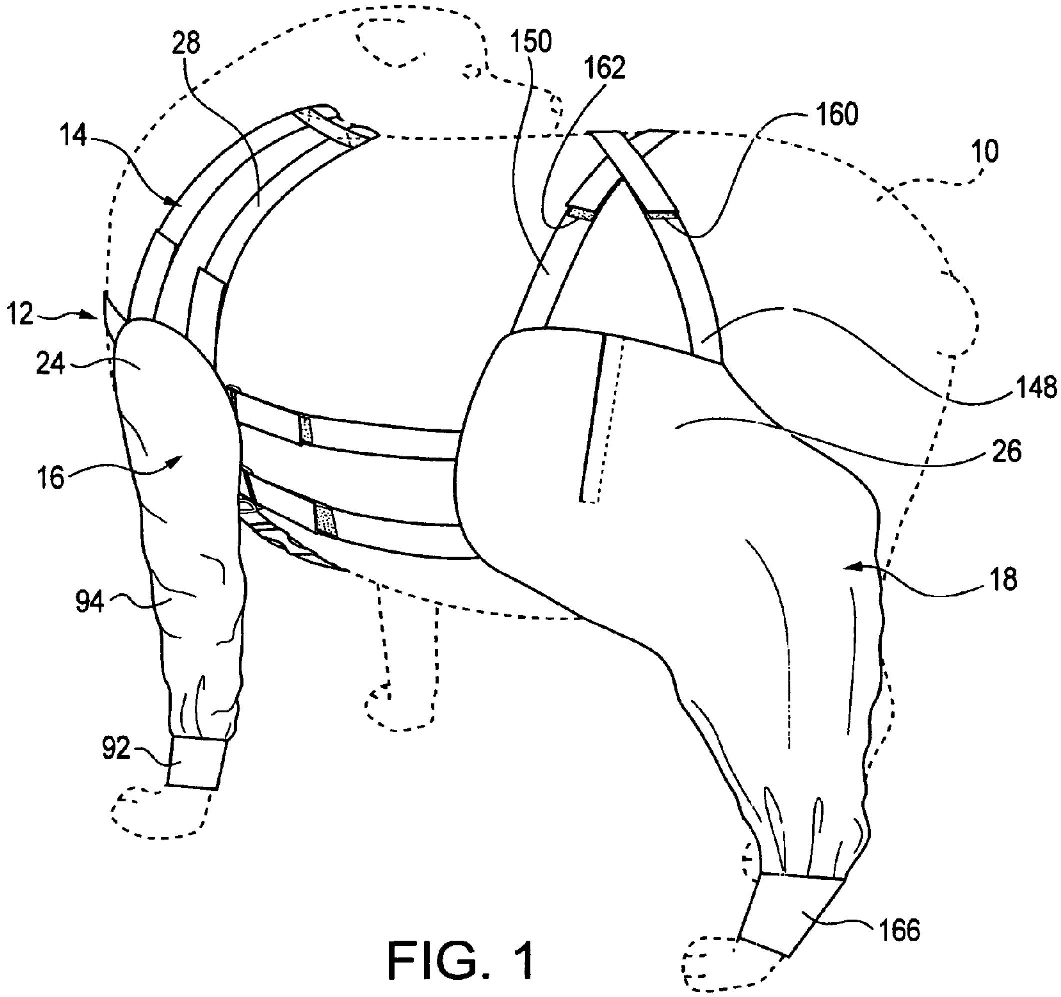
FIG. 1 is a perspective view of a dog, shown in dotted lines, with the harness portion of a leg covering assembly arranged on the left side of the dog's body and holding sleeve portions of the assembly on the dog's left foreleg and on the dog's left hind leg.
Figure 1A:
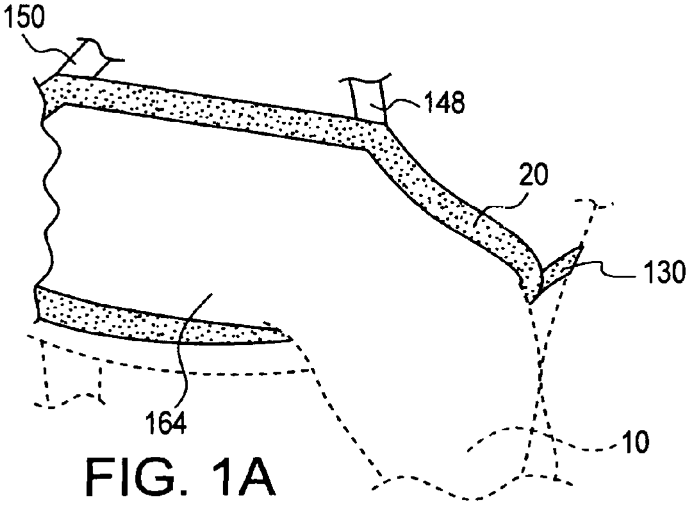
FIG. 1A is a perspective view of a portion of the assembly shown in FIG. 1 showing a connecting member arranged about the dog's left hind leg prior to a sleeve being attached to the connecting member.
Figure 2:
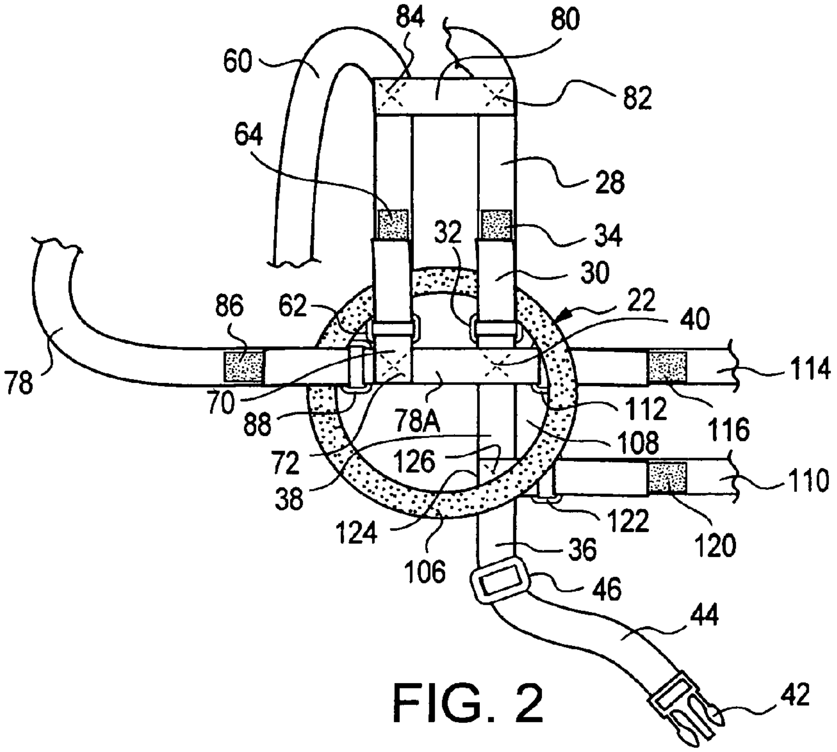
FIG. 2 is a perspective view of a portion of the assembly shown in FIG. 1 showing a connecting member arranged to be worn about the dog's left foreleg prior to a sleeve being attached to the connecting member.
Figure 3:
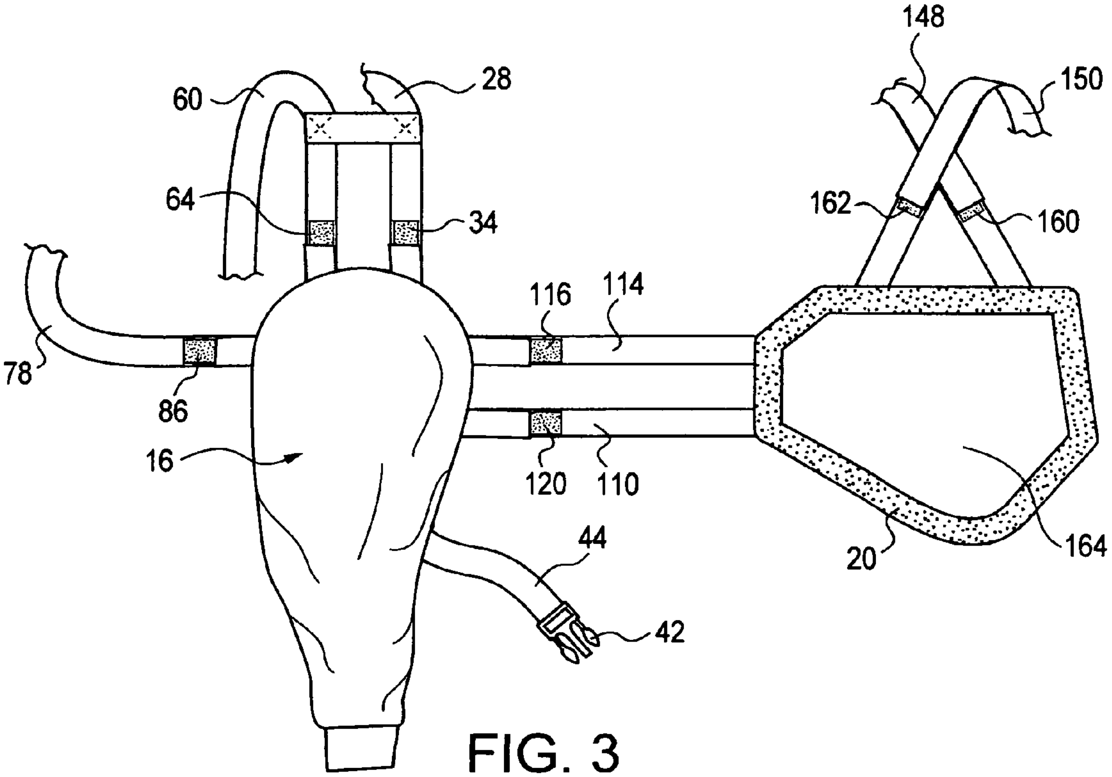
FIG. 3 is a perspective view partially broken away of the assembly shown in FIG. 1 arranged to be mounted on the dog's left side.

In FIG. 1, a dog 10, shown in phantom, is illustrated wearing a protective cover assembly 12 which includes a harness portion 14, a first sleeve portion 16 and a second sleeve portion 18. A connecting member 20 for engaging the second sleeve portion 18 on the harness portion 14 is shown in FIG. 1A extending around the dog's left hind leg. A similar connecting member 22 is shown in FIG. 2 for engaging the first sleeve portion 16 on the harness portion 14 around the dog's left foreleg. The harness portion 14 holds both sleeves, 16 and 18, high on the dog's legs where they cannot be dislodged by the animal while the legs are bandaged and recovering from surgeries. An upper or first end portion 24 of the first sleeve 16 is held high on the dog's left foreleg adjacent the dog's left shoulder by a hook and loop fastener on the inner face of connecting member 22, and an upper end portion 26 of the second sleeve 18 is held high over the dog's left hip by the hook and loop fastener on the inner face of connecting member 20.

The harness portion 14 of the protective cover assembly 12 is adjustable at several places, as will be described below, so that it can be securely fastened over the dog's body and continue to stay in place despite the dog's attempts to dislodge the sleeves.

As shown in FIGS. 1 and 2, a vertical shoulder strap 28 for the dog's left foreleg extends over the dog's back at approximately the dog's shoulder. The strap 28 has a downwardly extending end portion 30 which may be looped through a first side of link 32 and fixed in place with complementary hook and loop fastener covered segments 34. A belly portion 36 of strap 28 has an upper end portion 38 which is looped through a second side of link 32. Upper end portion 38 may be fastened onto link 32 with complementary hook and loop fastener covered segments (not shown) or by stitching 40 (see FIG. 2). A buckle segment 42 is attached to a loop in the lower end portion 44 of strap 28 with a moveable link 46. The link 46 may be adjusted in order to vary the size of the loop and fix how far the buckle segment 42 may be extended on strap 28.

Figure 4:
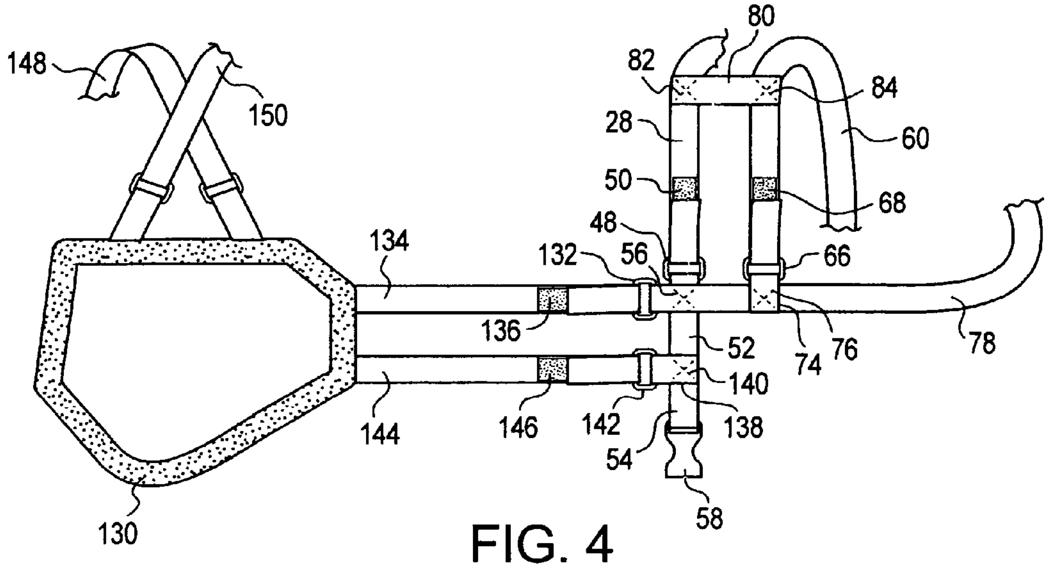
FIG. 4 is a perspective view of a dog's right side assembly of the harness system shown in FIG. 1 prior to attachment of a sleeve portion over the dog's right hind leg.
Figure 5:
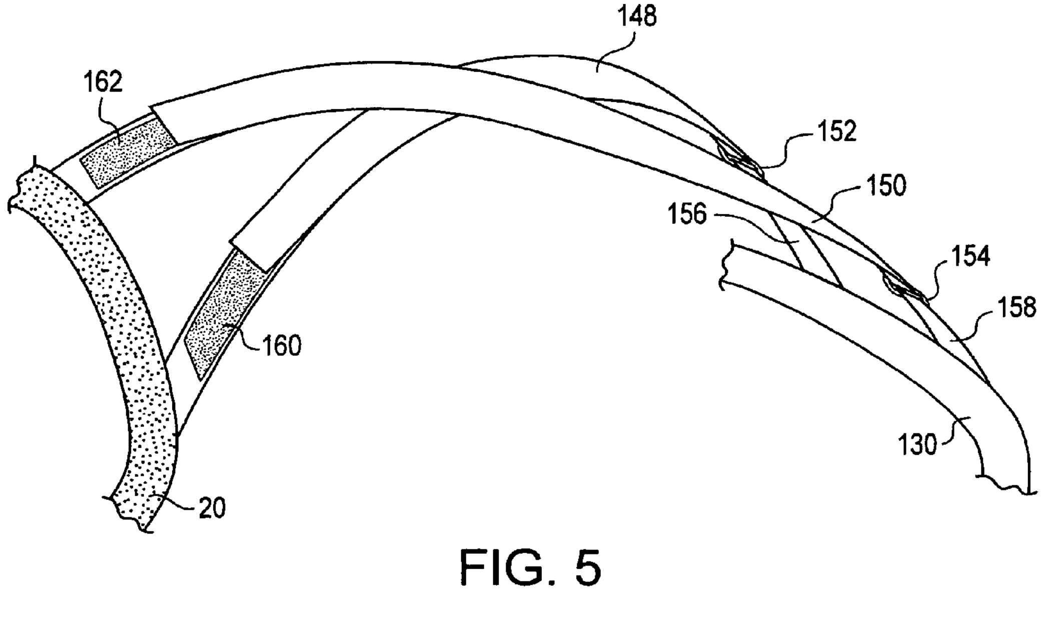
FIG. 5 is an enlarged perspective view partly broken away of a portion of the assembly shown in FIGS. 1, 3 and 4 arranged to be mounted over and support the assembly on the dog's hind quarters

The vertical strap 28 extends over the dog's back and is fastened into a first side of link 48 adjacent the dog's right shoulder with complementary hook and loop fastener covered segments 50 (see FIG. 4). A second belly portion 52 of strap 28 is looped through a second side of link 48 and fixed in place there by stitching 56. A second buckle segment 58, which locks onto the first buckle segment 42, is attached to the lower end portion 54 of belly portion 52 opposite link 48. The lower end portion is long enough to permit the second buckle segment 58 to be placed beneath the dog's belly and engage the first buckle segment 42 there.

A second vertical strap 60 fits over the dog's back adjacent the animal's shoulders. Strap 60 is fastened at one end next to the animal's left shoulder with a loop around a first side of link 62, fastened there with adjustably placed hook and loop fastener faced segments 64 (see FIG. 2). Strap 60 is also adjustably fixed at its opposite end next to the animal's right shoulder with a loop through a first side of link 66 accomplished by complementary hook and loop fastener faced segments 68 (see FIG. 4). Both links 62 and 66 are held in place by tabs which are stitched onto the harness 14, link 62 by a short tab 70 of strap material with stitching 72, and link 66 by a short tab 74 of strap material with stitching 76.

The vertical shoulder straps 28 and 60 are spaced apart on both sides of the dog's body. On the dog's left side, stitching 40 and stitching 72 are spaced apart along an upper horizontal upper strap 78 and its extension 78A, and on the dog's right side stitching 56 and stitching 76 are similarly spaced apart along the horizontal upper strap 78. The straps 28 and 60 are also kept from separating by a yoke 80 which is disposed on the straps above the animal's shoulders utilizing stitchings 82 and 84 on straps 28 and 60, respectively. The strap 78 also passes around the dog's chest, as shown in FIGS. 2 and 4, and can be adjusted there to fit the animal by varying the attachment of hook and loop fastener faced segments 86 which are engaged in link 88 adjacent the dog's left shoulder.

Figure 6:
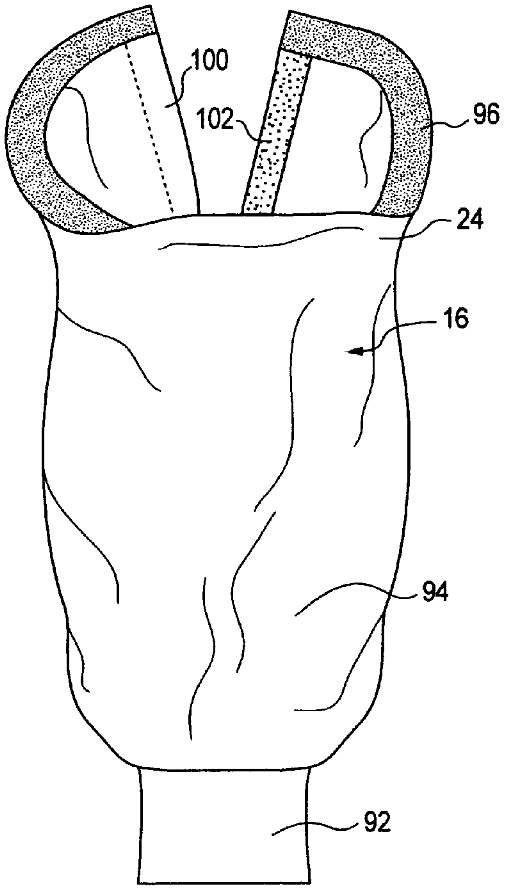
FIG. 6 is an enlarged perspective view of the left foreleg sleeve portion of the assembly shown in FIG. 1 prior to the foreleg sleeve portion being placed over the dog's leg and joined to the foreleg connecting member of the assembly.

The sleeve portion of the cover assembly 12 is typified by sleeve portion 16 shown on the dog's left foreleg in FIG. 1 and by itself in FIG. 6. Sleeve portion 16 includes a cuff member 92 which is arranged to fit the dog's leg near its paw and a leg covering member 94, as seen in FIG. 1. The leg covering member 94 is large enough to loosely cover the dog's entire leg, including any bandage on a surgical area, and extends high up on the dog's left shoulder where it is joined to the harness portion 14 through connecting member 22 which is a flexible strip of material. The hook and loop fastener faced strip 96 is such a gripping and fastening member for joining the leg covering member 94 to harness portion 14. The strip 96 is arranged around a distal edge of the inner face of the upper end portion 24 of sleeve portion 16, and accomplishes a secure junction with the harness portion. A slit or gusset 100, which form a flap that may be opened or closed with a hook and loop fastener faced panel 102 on the inside of sleeve portion 16 at the upper end 24, intersects and expands or decreases the distal edge of sleeve portion 16 and assists when pulling sleeve portion 16 up around the dog's leg. The hook and loop fastener faced strip 96 of material fastened inside the upper end 24 of the sleeve portion 16 is a flexible strip of material which also enables the upper end 24 of the sleeve 16 to be fastened onto the harness portion 14 high on the dog's left shoulder above the dog's elbow where the dog cannot dislodge it.

Figure 8:
FIG. 8 is an enlarged perspective view of the left foreleg sleeve portion, partly broken away, of the assembly shown in FIG. 1 and adding a sock covering the dog's front paw at the lower end of the sleeve.
Figure 9:
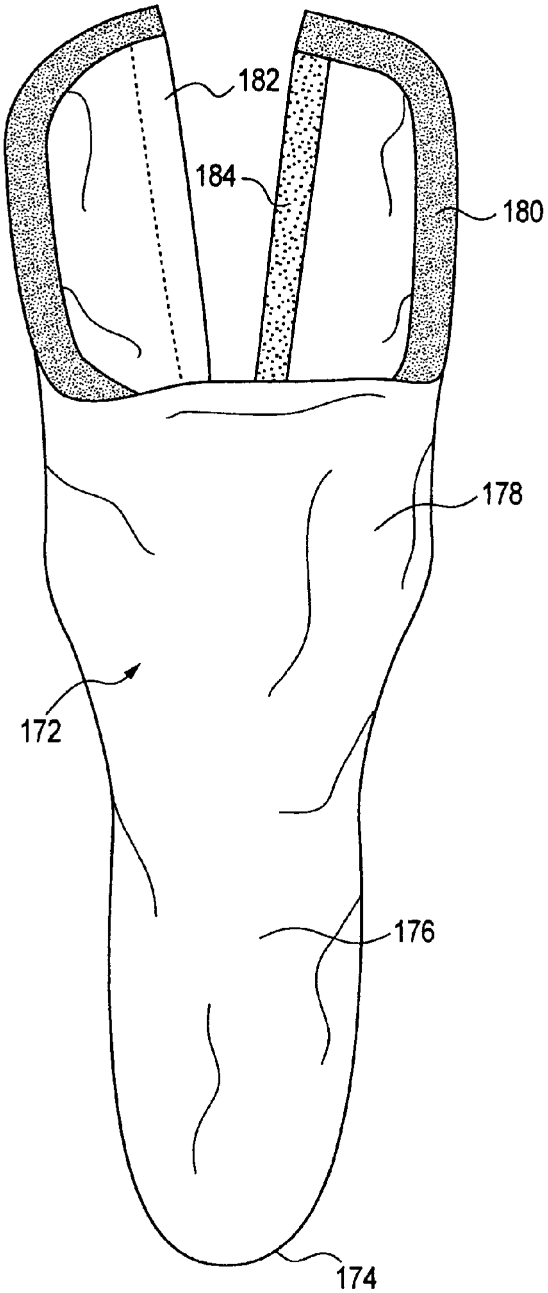
FIG. 9 is a perspective view of a modified form of the left foreleg portion of the leg covering assembly shown in FIGS. 6 and 8.

At times it may be desirable to cover the dog's paw with a sock 104. When that happens, the sock 104 may be placed over the dog's paw and the sleeve portion 16 fully pulled down over the animal's leg as shown in FIG. 8. Cuff 92 holds the sock 104 upper end securely, either by an elastic weave of the cuff material or by cooperative hook and loop fastener strips inside the cuff and on the sock, and keeps the sock on the dog's leg. Alternatively, as shown in FIG. 9, the sock may be an integral portion of the sleeve at the lower end of the sleeve.

The connecting member 22, mounted on harness portion 14, is shown in FIG. 2. Member 22 is preferably a circular strip of hook and loop fastener faced material with an open center 108. The circular strip form of member 22 is interlaced onto harness portion 14 behind vertical straps 28 and 60, and also onto horizontal upper strap extension 78A. A first portion 106 of connecting member 22 extends below horizontal upper strap 78 and its extension 78A and also forward of vertical shoulder strap 28. There, aperture 108 allows the dog's left foreleg to be placed through the connecting member 22, with first portion 106 of member 22 located behind the dog's leg adjacent to the dog's body but overlying strap 78A and a trailing lower horizontal strap 110. After the dog's left foreleg is put through the connecting member 22, the first sleeve 16 is placed over the dog's left foreleg and is joined to connecting member 22 by pressing hook and loop fastener faced strip 96 onto the connecting member 22. It should be noted that connecting member 22, being a supple fabric, has a lower section which folds up behind the dog's left foreleg and brings the body side of sleeve portion 16 up between the base of the dog's leg and the dog's body when sleeve portion 16 is pulled up.

When a sleeve portion is needed for protecting the dog's right foreleg, another hook and loop fastener faced connecting member like connecting member 22 is utilized, mounted on the right shoulder side of the harness 14 (see FIG. 4). The connecting member for holding a sleeve on the dog's right foreleg is interlaced into the right side harness straps, as just described for connecting member 22 on the left side, and a sleeve placed over the dog's right foreleg and engaged on the connecting member in the same way as a sleeve 16 was described fastened over the left foreleg.

While the protective cover assembly 12 may be used just to hold protective sleeves over one or both forelegs, additional straps, or traces, and sleeve portions besides those just described may be used to cover the dog's rear legs, with or without sleeves being applied to the animal's forelegs. As illustrated in FIGS. 1-5, the horizontal strap 78A is provided with a link 112 at the strap's trailing end. An upper trailing strap 114 forming a dorsal support member includes a forward end where complementary hook and loop fastener segments 116 on the end of the strap are looped through one side of link 112. The segments 116 may be attached together to form a larger or smaller loop and thus shorten or lengthen the distance covered by strap 114 along the dog's body. Similarly, lower trailing strap 110 forms a belly support member and is provided with complementary hook and loop fastener segments 120 at the strap's forward end for forming a loop in the strap through link 122. A tab 124 is stitched to the lower end portion of strap 28 with stitching 126 to hold the link 122 at that point and enable connecting the lower trailing strap 110 to the vertical strap 28 along the left side of the animal's body. The upper and lower trailing straps 114 and 110 are thus connected to the chest strap 78 and can be adjusted to fit the dog's body comfortable and also form a secure fit.

The left side upper and lower trailing straps 114 and 110, respectively, extend rearwardly along the dog's body toward the dog's left hind leg where they are connected to the hook and loop fastener faced rear leg connecting member 20. Connecting member 20 is generally oval in shape, and the rear ends of trailing straps 114 and 110 are joined to it along its forward side.

A similar arrangement for disposing a right hind leg connecting member 130 on the dog's body and connecting it to the forward portions of the harness 14 is shown in FIG. 4. An upper link 132 is attached to the trailing end of upper strap 78 where a forward end of the upper trailing strap 134, provided with adjustable complementary hook and loop fastener segments 136, is looped through and held by link 132. In addition, a tab 138 is fixed to the lower end 54 of strap 28 with stitching 140 in order to hold a link 142 to that strap, thereby enabling a forward end of a lower trailing strap 144, provided with adjustable complementary hook and loop fastener segments 146, to be fastened to link 142 by looping the complementary segments through the link. Connecting member 130, like connecting member 20, is generally oval in shape, and the rear ends of trailing straps 134 and 144 are joined to connecting member 130 along its forward side.

Connecting members 20 and 130 are also adjustably joined to each other over the dog's back with rump straps 148 and 150 which form dorsal support members. As shown particularly in FIGS. 4 and 5, links 152 and 154 are joined to connecting member 130 with tabs 156 and 158. Rump straps 148 and 150, which each have one end joined to left rear leg connecting member 20, have their other ends looped through links 152 and 154 by means of complementary adjustable hook and loop fastener segments 160 and 162.

Figure 7:
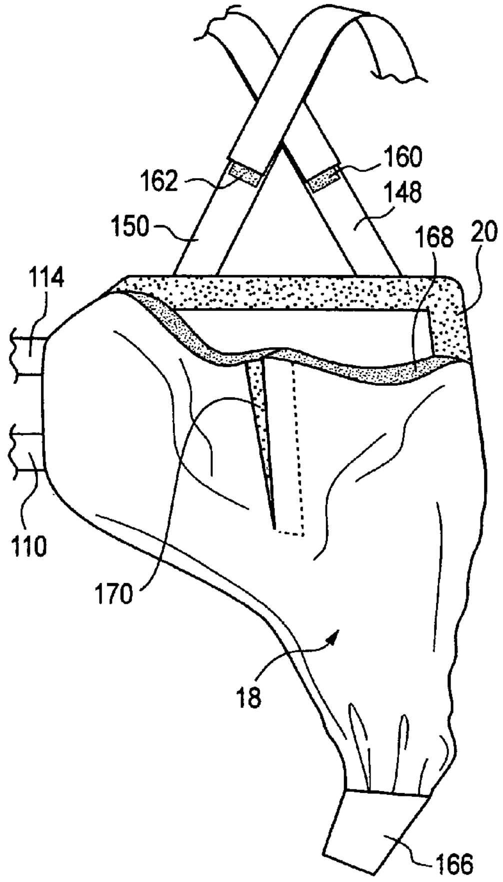
FIG. 7 is an enlarged perspective view of the left hind leg sleeve portion of the assembly shown in FIG. 1 prior to the hind leg sleeve portion being placed over the dog's leg and joined to the hind leg connecting member of the assembly.

The sleeve portions for the dog's hind legs are mirror images of each other, and the assembly connecting members for the front and hind legs are also quite similar. Accordingly, placement of only one sleeve portion over a hind leg needs to be described. Using the dog's left hind leg as an example, second sleeve portion 18 is brought over the dog's left hind leg and attached adjacent the dog's loin to connecting member 20 in much the same way as sleeve portion 16 is brought over the dog's left foreleg. As shown in FIG. 1A, the dog's left hind leg is inserted into the central opening 164 in connecting member 20 (see FIG. 3). Straps 148 and 150 are adjusted so that they hold connecting member 20 high on the dog's hip where it is difficult for the animal to reach. Then sleeve portion 18 is pulled up over the dog's left hind leg so that cuff 166 is disposed near the dog's paw (see FIG. 1). The upper end of sleeve portion 18 includes a hook and loop fastener faced strip 168 arranged on the inner side of the sleeve portion where it will be engageable on a complementary hook and loop fastener faced portion of connecting member 20. A hook and loop fastener faced slit 170 along the top of sleeve portion 18 may be opened to provide more of an opening at the upper end of sleeve portion 18 while bringing that sleeve portion up over the dog's hind leg. Thereafter, the slit may be closed when the sleeve portion 18 is in place. The hook and loop fastener faced strip 168 is then pressed into engagement with the connecting member 20, as shown in FIG. 7.

In the modified form of sleeve 172 shown in FIG. 9, the sock segment and the sleeve segment are integrally connected as a single unit having a sock element 174 at the lower end 176 of sleeve portion 172 and an upper end sleeve segment 178. Inside the upper end segment 178 of sleeve portion 172 there is a hook and loop fastener faced strip 180, similar to the strip 96 shown in FIG. 6. The strip 180, however, is elongated and somewhat oval or rectangular, and it conforms to and fits inside the distal edges of upper end sleeve segment 178. Also, similarly to the slit or gusset 100 and hook and loop fastener 102 shown in FIG. 6, the upper end sleeve segment 178 shown in FIG. 9 includes a slit or gusset 182 and a hook and loop fastener faced panel 184.

Figure 10:
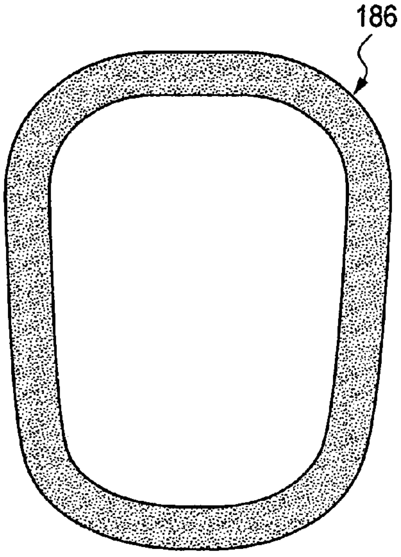
FIG. 10 is a plan view of a modified form of the connecting member in the assembly shown in FIG. 2 configured for engaging the left foreleg portion shown in FIG. 9.

The hook and loop faced fastener strip 180 is also the same size and configuration as the elongated connecting member 186 shown in FIG. 10, and strip 180 can be easily fastened to the connecting member 186 by pressing the two together. Like connecting member 22, connecting member 186 is substantially continuous and configured to be held in the harness portion 14 shown in FIG. 2 in the same way as the connecting member 22 is mounted there. When connecting member 186 is so mounted, the hook and loop fastener faces of strip 180 and connecting member 186 can be registered with each other and the sleeve portion 172 fastened to the harness portion 14 by pressing the fastener faces together.

Although particular forms of this invention have been illustrated and described, nevertheless, various modifications can be made without departing from the true spirit and scope of the invention. Accordingly, no limitation is intended by the foregoing description, and its full breadth is intended to be covered in the following claims.

I claim:

1. A cover assembly for protecting a leg of a dog comprising
- a harness portion which includes
  - a dorsal support member extending over the dog's withers and onto each side of the dog,
  - a belly support member connected to the dorsal support member on each side of the dog, and
  - a chest support member connected to the dorsal support member and the belly support member on each side of the dog,
- a sleeve portion which includes
  - a first end having an inner face and
  - a first gripping member mounted on the inner face, and
- a connecting member engaged on the dorsal, belly and chest support members and extending around the dog's leg, and including a second gripping member arranged to engage the first gripping member and join the sleeve portion to the harness portion.

2. The cover assembly of claim 1 in which the connecting member second gripping member is arranged to engage the sleeve portion first gripping member above the dog's elbow.

* * * * *